United States Patent [19]
Wolf et al.

[11] Patent Number: 5,676,291
[45] Date of Patent: Oct. 14, 1997

[54] PASSENGER CAR ROOF RACK ASSEMBLY

[75] Inventors: Erhard Wolf, Stuttgart; Thilo Ludewig, Leonberg, both of Germany

[73] Assignee: Dr. Ing. h.c.F. Porsche AG, Weissach, Germany

[21] Appl. No.: 558,287

[22] Filed: Nov. 13, 1995

[30] Foreign Application Priority Data

Nov. 12, 1994 [DE] Germany ............ 44 41 410.2

[51] Int. Cl.$^6$ .................................................. B60R 9/04
[52] U.S. Cl. ...................... 224/309; 224/325; 224/327; 224/329
[58] Field of Search ............................ 224/309, 325, 224/326, 327, 329, 316

[56] References Cited

U.S. PATENT DOCUMENTS

| | | | |
|---|---|---|---|
| 4,299,346 | 11/1981 | Helm | 224/325 |
| 4,538,752 | 9/1985 | Welter | 224/309 |
| 4,673,119 | 6/1987 | Bott | 224/326 |
| 5,292,045 | 3/1994 | Mandel | 224/309 |
| 5,470,003 | 11/1995 | Cucheran | 224/316 |

FOREIGN PATENT DOCUMENTS

| | | | |
|---|---|---|---|
| 580023 | 1/1994 | European Pat. Off. | 224/309 |
| 3520132A1 | 12/1986 | Germany . | |
| 8714471 | 1/1988 | Germany . | |
| 8715013 | 5/1988 | Germany . | |
| 3718727A1 | 12/1988 | Germany . | |
| 3739364A1 | 6/1989 | Germany . | |
| 4316947A1 | 11/1994 | Germany . | |
| 4317794A1 | 12/1994 | Germany . | |

OTHER PUBLICATIONS

European Search Report Feb. 14, 1996 EPX.
German Office Action Nov. 12, 1994 DEX.

Primary Examiner—Renee S. Luebke
Attorney, Agent, or Firm—Evenson, McKeown, Edwards & Lenahan, P.L.L.C.

[57] ABSTRACT

A roof rack assembly is disclosed for on a passenger car, particularly a convertible. The roof rack assembly includes two lateral frame parts extending in the longitudinal direction of the vehicle and front and rear transversely extending carrying elements fastened on the lateral frame parts. The two lateral frame parts are detachably held in position on the adjacent body of the passenger car. The lateral frame parts are formed as large-surface cast metal parts and each frame part has a molded-on forward and a rearward supporting section on which the transversely extending carrying elements rest and are fastened.

17 Claims, 2 Drawing Sheets

5,676,291

PASSENGER CAR ROOF RACK ASSEMBLY

BACKGROUND AND SUMMARY OF THE INVENTION

This invention relates to a roof rack on a passenger car, particularly a convertible, which comprises two lateral frame parts extending in the longitudinal direction of the vehicle and transversely extending carrying elements fixed on these frame parts, the two lateral frame parts being detachably held in position on the adjoining body of the passenger car.

A roof rack of the initially mentioned type is known from German Utility Model G 87 14 471.9. This utility model describes a roof rack for convertibles which consists of two spaced side member struts as well as of cross member struts fixed to the side member struts. The side member struts, on the one side, are fastened to the A-column and, on the other side, to the B-column or the roll-over bar.

From German Patent Document DE-OS 37 39 364, a roof rack for a convertible is known whose rearward feet for a support on the vehicle are fixed in the joint of the trunk lid and whose forward feet for a support on the roof frame are fixed in the area of the A-column or in the joint of the engine hood.

The roof racks of both of the above-mentioned prior art disclosures are composed of round or rectangular hollow profiles and are constructed as swivel racks in order to permit a forward and backward folding of the folding top when the roof rack is fitted on.

These known roof racks have the disadvantage that, because they are made of round or rectangular hollow profiles, high-expenditure welding and riveting connections or additional connecting elements are required which reduce torsional resistance as well as the maximal carrying capacity of the roof rack.

Furthermore, the use of round or rectangular hollow profiles limits the possibility of a free design and a manufacturing of difficult shapes so that an optimal adaptation of the roof rack to the vehicle styling is considerably limited.

It is an object of the invention to further develop a roof rack of the initially mentioned type such that the indicated disadvantages are avoided; the roof load which is maximally possible and permissible for the vehicle can be accommodated; and the roof rack can be constructed such that the visual appearance of the vehicle when the roof rack is in place is influenced in a positive manner.

According to the invention, this object is achieved by providing a roof rack assembly comprising two lateral frame parts extending in a longitudinal direction of the vehicle and transversely extending carrying elements fastened on these frame parts, wherein the two lateral frame parts are detachably held in position on the adjoining body of the passenger car, wherein the lateral frame parts are formed by large-surface cast metal parts, and wherein each lateral frame part has molded-on forward and rearward supporting sections on which the transversely extending carrying elements rest and are fastened.

The principal advantages achieved by means of the invention are that the lateral frame parts of the roof rack are manufactured in one piece from a cast metal.

The lateral frame parts are constructed in one piece with foot sections for fastening on the vehicle and with supporting sections for fastening the transversely extending carrying elements.

According to especially preferred embodiments of the invention, a hollow profile made of a light metal alloy (Al/Mg), which is open in the direction of the longitudinal center plane of the vehicle, permits a design of the lateral frame parts in such a manner that, while the appearance is pleasant and the weight is low, the required mechanical stability is achieved.

The manufacturing from cast metal also permits the stylistic designing of the lateral frame parts in a manner which positively influences the appearance of the vehicle when the roof rack is in place. The lateral frame parts follow the vehicle contour at a uniform distance which results in a compact construction.

The fastening of the roof rack on the passenger car takes place by way of specially constructed receiving devices in each case on the two vehicle sides on the upper end of the windshield frame (A-column) and on the top side of the lateral portion of the rear compartment, where holding elements are fastened which match the receiving devices and are mounted on the foot ends of the lateral frame parts.

Other objects, advantages and novel features of the present invention will become apparent from the following detailed description of the invention when considered in conjunction with the accompanying drawings.

DETAILED DESCRIPTION

Figure 1:
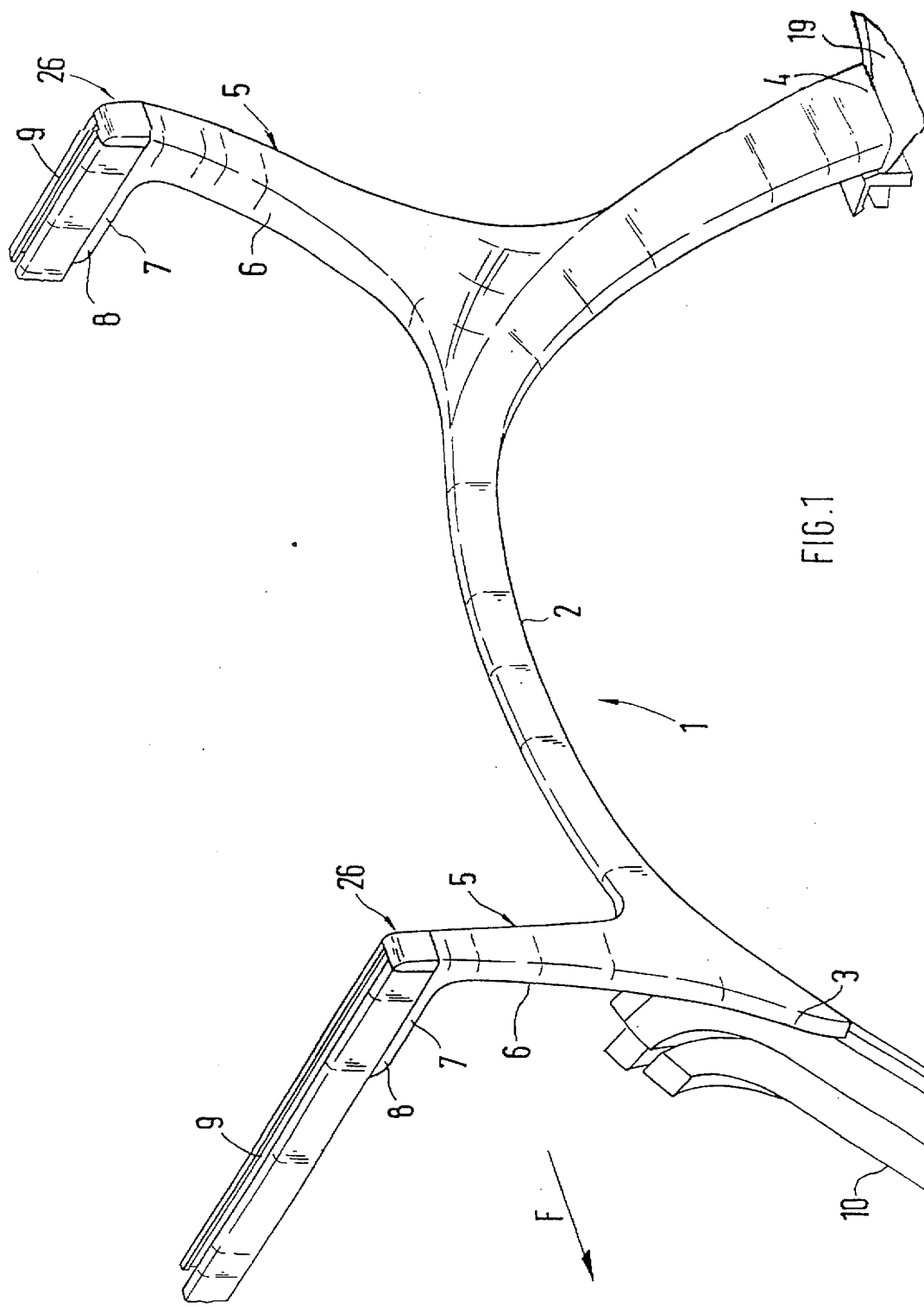
FIG. 1 is a perspective partial view of a roof rack assembly constructed according to a preferred embodiment of the present invention.

FIG. 1 illustrates one half of a roof rack 1 for a passenger car, particularly for a convertible or for an open vehicle provided with a hardtop. Two lateral frame parts 2 (one is shown in FIG. 1), which extend in the longitudinal direction of the vehicle, have foot sections 3, 4 which are used for fastening the roof rack 1 on the vehicle body. Supporting sections 5 for transversely extending carrying elements 9 are formed integrally on the lateral frame parts 2. These supporting sections 5, which are spaced away from one another, are constructed such that the transversely extending carrying elements 9 have a sufficient distance from one another for fastening longer loads and, when the vehicle is in the horizontal position, their tops (section 7) will be situated in a horizontal plane.

The two supporting sections 5 each have an angular construction and are composed of a first uprightly extending section 6 and a second transversely extending section 7, the second section 7 being aligned approximately horizontally and extending with its free end 8 in the direction of the longitudinal center plane of the vehicle.

For the fastening of the roof rack 1 on the vehicle, this vehicle has forward and rearward receiving devices 11, 12 on which the forward and rearward foot sections 3, 4 of the roof rack 1 can be fastened.

Figure 2:
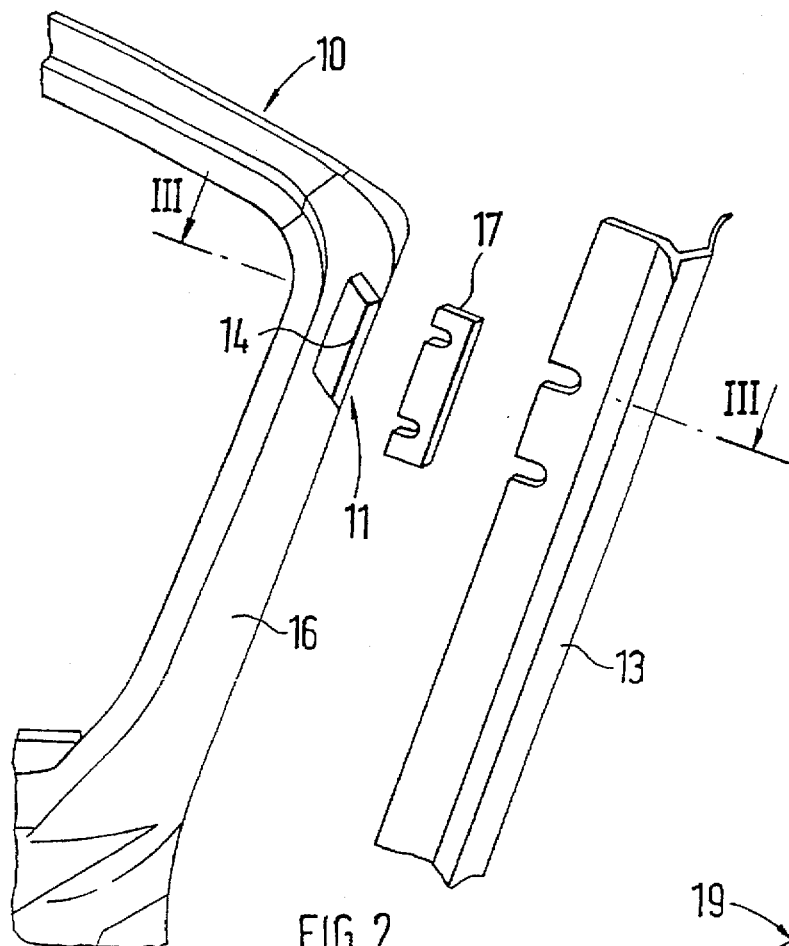
FIG. 2 is a perspective partly exploded schematic view of a forward roof rack receiving device constructed according to a preferred embodiment of the present invention.
Figure 3:
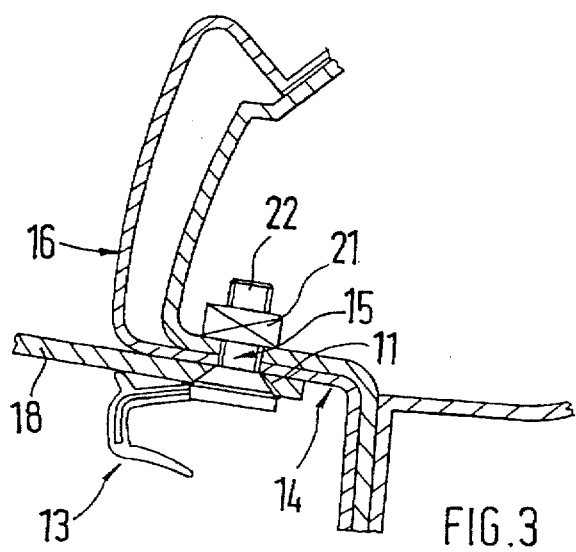
FIG. 3 is a sectional view taken along line III—III of FIG. 2, but showing an assembled condition of the parts.

The forward receiving devices 11 are mounted on an upper, laterally exterior area of the windshield frame 10. As illustrated in FIGS. 2 and 3, the receiving devices 11 are situated behind the door sealing profile 13 in an area which is accessible only when the side door of the vehicle is open (antitheft protection). The receiving devices 11 consist of impressions 14 on the A-column 16 which are provided with screwed fastenings 15. Each screwed fastening 15 comprises two weld nuts 21 which are held in position in the impression 14 and into which the fastening screws 22 are screwed.

When the roof rack 1 is not in place, a filling piece 17 is inserted into the impression 14 in order to prevent a falling-in of the sealing profile 13 in the area of the impression 14, which filling piece 17 is removed before the mounting of the roof rack 1.

After the removal of the filling piece 17 and during the mounting of the roof rack 1, a connection piece 18, which is mounted on the forward foot section 3 of the roof rack 1, is screwed to the A-column by means of the screwed fastening 15. This connection piece 18 may be cast integrally to the lateral frame part 2, but may also have a separate construction according to alternate contemplated embodiments of the invention.

By means of the fastening screws 22, either the filling piece 17 or the forward foot section 3 of the roof rack 1 is held in position on the A-column 16 of the windshield frame 10.

Figure 4:
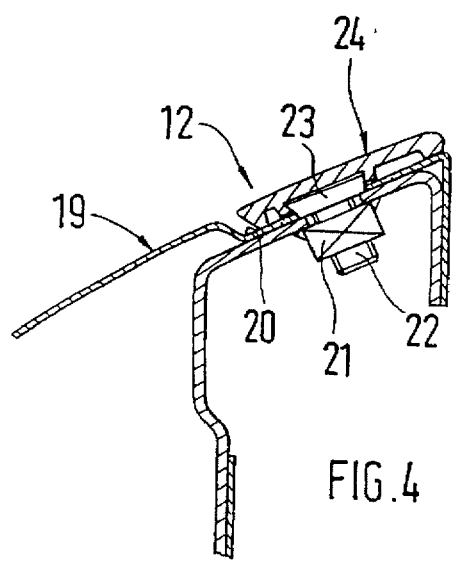
FIG. 4 is a sectional view of the rearward roof rack receiving device of FIG. 2.

FIG. 4 illustrates a rearward receiving device 12 constructed on the lateral rear compartment sides 19 for the rearward foot section 4 of a lateral frame part 2 of the roof rack 1.

The lateral rear compartment part 19 has a local indentation 20 and two weld nuts 21 (one is shown) fastened in the area of the indentation 20. Screws 22, which have a conical screw head 23, are screwed into the weld nuts 21.

In comparison to the forward foot sections 3, the rearward foot sections 4 can by fastened by way of connection parts by means of screws on the vehicle body. The connection parts, in turn, may be integrally cast to the lateral frame part 2 or may be constructed separately.

When the roof rack 1 is not installed, the receiving device 12 is covered by a slide 24 which interacts with the conical head sections 23 of the screws 22. In comparison to the filling piece 17, the slide 24 can be moved in the longitudinal direction of the vehicle into a release position only when the vehicle side door is open and can then be removed (antitheft protection). The rearward foot section 4 of the roof rack 1 can be fixed on the receiving device 12 either by means of the screws 22 or by differently shaped screws.

The cross-sectional profile of the lateral frame parts 2 is designed corresponding to the forces occurring when the roof rack is loaded. This profile widens continuously from the windshield frame 10 toward the rear and has a curved course. For reasons of appearance, the curved course is adapted approximately to the course of the adjoining edge area of the door window pane.

In the same manner, the lay-out and design of the forward and rearward supporting sections 5 take place which widen continuously in the downward direction.

The lateral frame parts 2 are made of a light metal alloy (Mg, Al alloy) and have a relatively thin wall thickness (approximately 3 mm to 4 mm).

Figure 5:
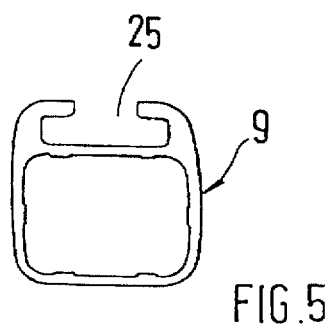
FIG. 5 is a profile cross-section of a transversely extending carrying element of the assembly of FIGS. 1–4.

The transversely extending carrying elements 9 fastened on the supporting sections 5 of the lateral frame parts 2 consist of hollow extruded profiles (see FIG. 5) which have a receiving groove 25 for commercially available special holders, for example, for roof trunks, skis, bicycles, surfboards, etc. At their lateral ends, the extruded profiles are closed off by inserted covering elements 26 and can be locked (antitheft protection).

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Roof rack assembly on a passenger car, comprising:

two lateral frame parts extending in a longitudinal direction of the passenger car having integrally formed therewith forward and rearward foot sections, and transversely extending carrying elements fastened on these frame parts, wherein the two lateral frame parts are detachably held in position on an adjoining body of the passenger car, wherein the lateral frame parts are formed by large-surface cast metal parts, and wherein each lateral frame part has integrally formed forward and rearward supporting sections on which the transversely extending carrying elements rest and are fastened.

2. Roof rack assembly according to claim 1, wherein a cross-section of each of the lateral frame parts widens continuously from a windshield frame toward a passenger car rear, and wherein the frame parts have a curved course which corresponds approximately to a course of an adjoining edge area of a door window pane of the passenger car.

3. Roof rack assembly according to claim 1, wherein the frame parts are manufactured of a light metal alloy.

4. Roof rack assembly according to claim 3, wherein the light metal alloy is a Mg Al alloy.

5. Roof rack assembly according to claim 1, wherein the two supporting sections are each constructed to be angular and are composed of a first upright extending section and of a second transversely extending section, the second section being aligned in an approximately horizontal manner and extending with a free end in a direction of a longitudinal center plane of the passenger car when the passenger car is in a level horizontal position.

6. Roof rack assembly according to claim 5, wherein a cross-section of each of the lateral frame parts widens continuously from a windshield frame toward a passenger car rear, and wherein the frame parts have a curved course which corresponds approximately to a course of an adjoining edge area of a door window pane of the passenger car.

7. Roof rack assembly according to claim 5, wherein the first upright extending supporting sections widen continuously from the respective forward and rearward supporting sections in the downward direction.

8. Roof rack assembly according to claim 1, wherein a forward end of each lateral frame part is detachably fastened by way of a respective forward foot section to a receiving device of a windshield frame of the passenger car.

9. Roof rack assembly according to claim 8, wherein the receiving device is provided on an A-column of the windshield frame and is accessible only when an associated passenger car side door is open.

10. Roof rack assembly according to claim 9, wherein a filling piece is insertable into the receiving device when the roof rack is not in place, which filling piece is removed when the roof rack is mounted.

11. Roof rack assembly according to claim 10, wherein the two supporting sections are each constructed to be angular and are composed of a first upright extending section and of a second transversely extending section, the second section being aligned in an approximately horizontal manner and extending with a free end in a direction of a longitudinal center plane of the passenger car when the passenger car is in a level horizontal position.

12. Roof rack assembly according to claim 11, wherein a cross-section of each of the lateral frame parts widens continuously from the windshield frame toward a passenger car rear, and wherein the frame parts have a curved course which corresponds approximately to a course of an adjoining edge area of a door window pane of the passenger car.

13. Roof rack assembly according to claim 1, wherein a rearward end of each of the lateral frame parts is detachably fastened on a receiving device constructed on a top side of a lateral part of a rear compartment of the passenger car.

14. Roof rack assembly according to claim 13, wherein the receiving devices constructed on the lateral part of the rear compartment are covered by a slide in their inoperative position, and wherein the slide can be moved into a release position only when an associated passenger car side door is open.

15. Roof rack assembly according to claim 14, wherein the slide interacts in a longitudinally displaceable manner with at least one head section of a screw screwed into a weld nut, whereas the slide is fixed in the transverse direction by means of the head section.

16. Roof rack assembly according to claim 14, wherein the two supporting sections are each constructed to be angular and are composed of a first upright extending section and of a second transversely extending section, the second section being aligned in an approximately horizontal manner and extending with a free end in a direction of a longitudinal center plane of the passenger car when the passenger car is in a level horizontal position.

17. Roof rack assembly according to claim 16, wherein a cross-section of each of the lateral frame parts widens continuously from a windshield frame toward a passenger car rear, and wherein the frame parts have a curved course which corresponds approximately to a course of an adjoining edge area of a door window pane of the passenger car.

* * * * *